(12) United States Patent
Fan et al.

(10) Patent No.: US 12,134,980 B2
(45) Date of Patent: Nov. 5, 2024

(54) LIQUID AMMONIA PHASE-CHANGE COOLING TYPE HYBRID POWER THERMAL MANAGEMENT SYSTEM

(71) Applicant: Harbin Engineering University, Harbin (CN)

(72) Inventors: Liyun Fan, Harbin (CN); Yunpeng Wei, Harbin (CN); Yuntao Mao, Harbin (CN); Jing Xu, Harbin (CN); Yuelin Wu, Harbin (CN); Hanwen Zhang, Harbin (CN)

(73) Assignee: Harbin Engineering University, Harbin (CN)

( * ) Notice: Subject to any disclaimer, the term of this patent is extended or adjusted under 35 U.S.C. 154(b) by 332 days.

(21) Appl. No.: 17/676,357

(22) Filed: Feb. 21, 2022

(65) Prior Publication Data
US 2023/0160330 A1     May 25, 2023

(30) Foreign Application Priority Data
Nov. 19, 2021   (CN) .......................... 202111374434.4

(51) Int. Cl.
*F01P 3/02* (2006.01)
*F01P 3/00* (2006.01)

(52) U.S. Cl.
CPC ........... *F01P 3/02* (2013.01); *F01P 2003/001* (2013.01); *F01P 2003/021* (2013.01)

(58) Field of Classification Search
CPC .. F01P 3/02; F01P 2003/001; F01P 2003/021; F02D 19/0644; F02D 19/0684; F02D 19/0694; F02D 19/10; F02M 43/04; F02M 43/00; F02M 51/0653; F02M 55/025; F02M 57/025; F02M 63/0035; F02M 2200/315; F02M 2200/40; F02M 2200/44; F02M 55/04; F02M 61/10; H01M 2250/407; H01M 8/00; Y02T 10/12; Y02T 10/30; F02B 65/00; F02B 2201/062; F25B 30/00
USPC ...................................................... 123/41.21
See application file for complete search history.

(56) References Cited

U.S. PATENT DOCUMENTS

| | | | |
|---|---|---|---|
| 2003/0074900 A1* | 4/2003 | McFarland | F02C 1/10 60/645 |
| 2014/0374058 A1* | 12/2014 | Greiner | F28D 20/003 165/51 |

* cited by examiner

*Primary Examiner* — Lindsay M Low
*Assistant Examiner* — Omar Morales
(74) *Attorney, Agent, or Firm* — WC&F IP

(57) ABSTRACT

A liquid ammonia phase-change cooling type hybrid power thermal management system. The system comprises an injector, a liquid ammonia hydrogen supply system, a liquid ammonia common rail pipe, a fuel oil common rail pipe and an oil tank, wherein the liquid ammonia hydrogen supply system comprises a liquid ammonia storage tank, an ammonia pumping system, a flow dividing system and an ammonia inlet and outlet system, the fuel oil common rail pipe is respectively connected with the oil tank and a one-way oil inlet of the injector, the liquid ammonia common rail pipe is respectively connected with the ammonia inlet and outlet system and a one-way ammonia inlet of the injector, an ammonia inlet pipe and an ammonia return pipe are arranged in the ammonia inlet and outlet system, the ammonia pumping system comprises a liquid ammonia storage flow divider, a low-pressure pump and a high-pressure pump.

4 Claims, 12 Drawing Sheets

LIQUID AMMONIA PHASE-CHANGE COOLING TYPE HYBRID POWER THERMAL MANAGEMENT SYSTEM

CROSS REFERENCE TO RELATED APPLICATION(S)

This patent application claims the benefit and priority of Chinese Patent Application No. 202111374434.4, filed on Nov. 19, 2021, the disclosure of which is incorporated by reference herein in its entirety as part of the present application.

TECHNICAL FIELD

The present disclosure relates to an engine, and specifically relates to a hybrid power engine.

BACKGROUND

Under the large background of green and low-carbon ships, ship development enters a key transformation and upgrading period, the ships require high power flexibility in the future, and the power flexibility comprises flexible configuration of power devices, flexibility of fuel supply and injection systems and flexibility of fuel storage, lightering and filling. Power diversity and fuel diversity are inevitable trends of ship development, and therefore development and research of a low-carbon clean fuel supply and injection system for ships are key measures for meeting current and future technological development requirements and improving technological innovation, product competitiveness and enterprise influence Ammonia, as one of the typical low carbon fuels, is higher in energy storage and convenient to store and transport than hydrogen fuels, has a mature supply chain, and is one of main low-carbon alternative energy sources.

The ammonia fuel and other novel alternative fuels have the common characteristics of low viscosity, low flash point (liquid fuel), low carbon and low emission, so that existing equipment, especially a fuel supply and injection system, needs to be subjected to great technical upgrading and transformation to meet the use requirements of the novel fuels. Meanwhile, it is worth noting that although the novel alternative fuel has great emission reduction potential from the perspective of engine combustion emission, the existing alternative fuel needs to solve the problem of energy green regeneration from the whole life cycle of the fuel, so that the transformation of the whole energy industry chain is driven. At present, no mature ammonia fuel power device exists internationally, an ammonia fuel engine improved by a diesel engine has the problems of low volume efficiency, poor combustion effect, low heat efficiency and energy utilization rate and the like, and popularization and application are limited.

Thus, by adopting a diesel ignition combustion mode, an ammonia fuel injection system is designed, so that ammonia fuel is injected into a cylinder in a liquid state under high pressure, the operation compression ratio of the engine is improved, and the heat efficiency is effectively improved. Compared with existing patents, the double-acting heat pump module is innovatively designed based on the liquid ammonia phase-change cooling principle, firstly, the cold starting problem of the engine under the cold condition can be effectively solved, secondly, the power consumption of the compressor is reduced, waste heat utilization is achieved, and the energy utilization rate is improved. Meanwhile, a feasible ammonia fuel application path is provided, and ammonia can be used for three purposes: a fuel device fuel, a radiator system refrigerant and a discharge aftertreatment module reducing agent. The emission performance of the engine is improved, and the carbon emission is gradually reduced to the maximum extent while the dynamic property and the economical efficiency are guaranteed.

SUMMARY

The present disclosure aims to provide a liquid ammonia phase-change cooling type hybrid power thermal management system which can effectively solve the problem of cold start of an engine under a cold condition, reduce the power consumption of a compressor, realize waste heat utilization and improve the energy utilization rate.

The purpose of the present disclosure is realized as follows:

The liquid ammonia phase-change cooling type hybrid power thermal management system in the present disclosure comprises an injector, a liquid ammonia hydrogen supply system, a liquid ammonia common rail pipe, a fuel oil common rail pipe and an oil tank, wherein the liquid ammonia hydrogen supply system comprises a liquid ammonia storage tank, an ammonia pumping system, a flow dividing system and an ammonia inlet and outlet system, the fuel oil common rail pipe is respectively connected with the oil tank and a one-way oil inlet of the injector, the liquid ammonia common rail pipe is respectively connected with the ammonia inlet and outlet system and a one-way ammonia inlet of the injector, an ammonia inlet pipe and an ammonia return pipe are arranged in the ammonia inlet and outlet system, the ammonia pumping system comprises a liquid ammonia storage flow divider, a low-pressure pump and a high-pressure pump, the flow dividing system comprises a storage tank, an ammonia inlet control valve, a safety valve and an ammonia outlet control valve, an outlet of the liquid ammonia storage tank is sequentially connected with the low-pressure pump, the high-pressure pump, the liquid ammonia storage flow divider, the storage tank and the ammonia inlet control valve, the ammonia inlet control valve is connected with the liquid ammonia common rail pipe through the ammonia inlet pipe, an inlet of the liquid ammonia storage tank is sequentially connected with an ammonia outlet control valve and the safety valve, the safety valve is connected with the injector through the ammonia return pipe, and the liquid ammonia storage tank is respectively connected with a hydrogen storage tank and a nitrogen storage tank.

The present disclosure further has the following characteristics:

Firstly, the injector comprises an injector body, a liquid ammonia injection part and a diesel injection part, the liquid ammonia injection part and the diesel injection part are located in the injector body, the liquid ammonia injection part comprises a pressurizing module, a first pressure storage resonance flow-limiting module, a super-hysteresis electromagnetic control actuator and a phase-change controllable super-atomization nozzle module which are arranged from top to bottom, and the diesel injection part comprises a second pressure storage resonance flow-limiting module, an auxiliary pressurizing module, a pressure balance type electromagnetic control actuator and a needle valve eccentric self-adjusting nozzle which are arranged from top to bottom.

Secondly, the pressurizing module comprises a pressurizing magnet yoke, pressurizing main and auxiliary magnetic poles, a main pressurizing piston, a pressurizing armature, a pressurizing limited block, a pressurizing double-sealing valve rod, a pressurizing upper valve rod seat and a pressurizing lower valve rod seat, the pressurizing armature sleeves the top of the pressurizing double-sealing valve rod, a pressurizing reset spring is arranged between the pressurizing magnet yoke and the pressurizing armature, the pressurizing main and auxiliary magnetic poles are arranged on the outer side of the pressurizing reset spring, coils are wound around the pressurizing main and auxiliary magnetic poles, the middle of the pressurizing double-sealing valve rod is located in the pressurizing upper valve rod seat, the bottom of the pressurizing double-sealing valve rod is located in the pressurizing lower valve rod seat, the middle of the pressurizing double-sealing valve rod is sleeved with a pressurizing valve rod reset spring, a pressurizing double-sealing protrusion is arranged between the middle and the bottom of the pressurizing double-sealing valve rod, sealing surfaces are arranged on the surfaces, corresponding to the pressurizing double-sealing valve rod, of the pressurizing upper valve rod seat and the pressurizing lower valve rod seat, the main pressurizing piston is located below the pressurizing lower valve rod seat and externally sleeved with a main pressurizing piston reset spring, a connected ammonia return channel is arranged in the pressurizing upper valve rod seat, an ammonia inlet channel and a middle pipeline are arranged in the pressurizing lower valve rod seat, the space where the pressurizing double-sealing protrusion is located in the pressurizing lower valve rod seat is a connected space, and the connected space communicates with the middle pipeline.

Thirdly, the first pressure storage resonance flow-limiting module comprises a resonance block, a middle block, a prismatic sealing block, a flow-limiting piston and a pressure storage valve seat, a pressure storage cavity is formed in the injector body below the main pressurizing piston, the one-way ammonia inlet is formed in the side wall of the pressure storage cavity, a liquid cooling pipe inlet is formed in the injector body and communicates with the pressure storage cavity, the resonance block, the middle block, the prismatic sealing block and the pressure storage valve seat are sequentially arranged below the pressure storage cavity, the flow-limiting piston is arranged in the pressure storage valve seat, a middle block reset spring is arranged in the middle block, an ammonia inlet hole and a resonance block ammonia inlet path throttling hole are respectively formed in the bottom of the middle block, the prismatic sealing block is located above the flow-limiting piston, a middle hole is formed in the flow-limiting piston, a flow-limiting piston reset spring is arranged below the flow-limiting piston, and a storage cavity is formed below the flow-limiting piston reset spring.

Fourthly, a first ammonia inlet path, a second ammonia inlet path, a first ammonia inlet cavity, a second ammonia inlet cavity, a first ammonia outlet path and a second ammonia outlet path are respectively arranged in the resonance block, the first ammonia inlet cavity respectively communicates with the first ammonia inlet path and the first ammonia outlet path, the second ammonia inlet cavity respectively communicates with the second ammonia inlet path and the second ammonia outlet path, the first ammonia inlet cavity communicates with the second ammonia inlet cavity through a communicating hole, the first ammonia inlet cavity communicates with the first ammonia inlet path through a first ammonia inlet throttling hole, the first ammonia inlet cavity communicates with the pressure storage cavity through a second ammonia inlet throttling hole, and the first ammonia inlet path and the second ammonia inlet path communicate with the pressure storage cavity.

Fifthly, the super-hysteresis electromagnetic control actuator comprises super-hysteresis main and auxiliary magnetic poles, a hysteresis seat, a super-hysteresis upper valve rod, a super-hysteresis lower end cone valve and a super-hysteresis poppet valve, coils are wound in the super-hysteresis main and auxiliary magnetic poles, a super-hysteresis material is arranged in through holes of the super-hysteresis main and auxiliary magnetic poles, a hysteresis seat, a super-hysteresis upper valve rod, a super-hysteresis lower end cone valve and a super-hysteresis poppet valve are sequentially arranged below the super-hysteresis material, the super-hysteresis poppet valve is located in a super-hysteresis poppet valve cavity, a super-hysteresis poppet valve reset spring is arranged below the super-hysteresis poppet valve, an oil return oil channel and an oil inlet oil channel are arranged in the injector body where the super-hysteresis electromagnetic control actuator is located, the oil return oil channel communicates with the super-hysteresis poppet valve cavity, a super-hysteresis cone valve oil inlet hole is formed in a super-hysteresis lower end cone valve shell outside the super-hysteresis lower end cone valve, and the super-hysteresis cone valve oil inlet hole communicates with the oil inlet oil channel.

Sixthly, the phase-change controllable super-atomization nozzle module comprises a super-atomization nozzle body, a super-atomization valve seat, a static leakage-free cylinder, a super-atomization needle valve body and a super-atomization control valve rod, the super-atomization valve seat is located in the super-atomization nozzle body, the static leakage-free cylinder and the super-atomization needle valve body are located in the super-atomization valve seat, the head of the super-atomization needle valve body is located in the static leakage-free cylinder, a super-atomization needle valve body reset spring is arranged between the middle of the super-atomization needle valve body and the static leakage-free cylinder, an ammonia storage cavity is formed among the static leakage-free cylinder, the super-atomization needle valve body and the super-atomization valve seat, a liquid cooling working medium inlet pipeline and a liquid cooling working medium outlet pipeline are formed between the super-atomization valve seat and the super-atomization nozzle body, the bottom of the super-atomization needle valve body and the bottom of the super-atomization valve seat form a super-atomization injection flow channel, the ammonia storage cavity communicates with the storage cavity, and a super-atomization control cavity is formed between the top of the super-atomization needle valve body and the injector body above the super-atomization needle valve body.

Seventhly, the structure of the second pressure storage resonance flow-limiting module is the same as that of the first pressure storage resonance flow-limiting module, and the second pressure storage resonance flow-limiting module and the first pressure storage resonance flow-limiting module are arranged in the injector body in parallel.

Eighthly, the auxiliary pressurizing module comprises an auxiliary pressurizing magnet yoke, auxiliary pressurizing main and auxiliary magnetic poles, an auxiliary pressurizing piston, an auxiliary pressurizing armature, an auxiliary pressurizing limited block, an auxiliary pressurizing double-sealing valve rod, an auxiliary pressurizing upper valve rod seat and an auxiliary pressurizing lower valve rod seat, the auxiliary pressurizing armature sleeves the top of the auxiliary pressurizing double-sealing valve rod, an auxiliary pressurizing reset spring is arranged between the auxiliary pressurizing magnet yoke and the auxiliary pressurizing armature, auxiliary pressurizing main and auxiliary magnetic poles are arranged on the outer side of the auxiliary pressurizing reset spring, coils are wound around the auxiliary pressurizing main and auxiliary magnetic poles, the middle of the auxiliary pressurizing double-sealing valve rod is located in the auxiliary pressurizing upper valve rod seat, the bottom of the auxiliary pressurizing double-sealing valve rod is located in the auxiliary pressurizing lower valve rod seat, the middle of the auxiliary pressurizing double-sealing valve rod is sleeved with an auxiliary pressurizing valve rod reset spring, an auxiliary pressurizing double-sealing protrusion is arranged between the middle and the bottom of the auxiliary pressurizing double-sealing valve rod, sealing surfaces are arranged on the surfaces, corresponding to the auxiliary pressurizing double-sealing valve rod, of the auxiliary pressurizing upper valve rod seat and the auxiliary pressurizing lower valve rod seat, the auxiliary pressurizing piston is located below the auxiliary pressurizing lower valve rod seat and externally sleeved with an auxiliary pressurizing piston reset spring, an oil return pipeline is arranged in the auxiliary pressurizing upper valve rod seat, an auxiliary pressurizing oil channel and an auxiliary pressurizing communicating channel are arranged in the lower valve rod seat, the auxiliary pressurizing oil channel respectively communicates with an oil inlet channel and the lower portion of the auxiliary pressurizing double-sealing protrusion, the space where the auxiliary pressurizing double-sealing protrusion is located is a connected space, the auxiliary pressurizing communicating channel respectively communicates with the connected space and the upper portion of the auxiliary pressurizing piston, a sealing ball is arranged in the oil inlet channel, a sealing ball reset spring is arranged below the sealing ball, and a pressurizing oil pipeline is arranged below the auxiliary pressurizing piston and communicates with the oil inlet channel below the sealing ball reset spring.

Ninthly, the pressure balance type electromagnetic control actuator comprises pressure control type main and auxiliary magnetic poles, a pressure control type armature and a balance valve rod, the upper portion of the balance valve rod is arranged in the pressure control type main and auxiliary magnetic poles, the lower portion of the balance valve rod is located in the pressure control type armature, the pressure control type armature is located below the pressure control type main and auxiliary magnetic poles, a pressure control type oil return hole upper section and a pressure control type oil return hole lower section are arranged below the pressure control type armature and the balance valve rod, the pressure control type oil return hole upper section and the pressure control type oil return hole lower section are connected through a pressure control type oil return throttling hole, and the pressure control type oil return hole lower section communicates with oil inlet pipelines through pressure control type oil inlet throttling holes.

Tenthly, the needle valve eccentric self-adjusting nozzle comprises an eccentric self-adjusting middle block, an eccentric self-adjusting needle valve body, an eccentric self-adjusting needle valve body shell, an eccentric self-adjusting valve block and an eccentric self-adjusting nozzle body, the eccentric self-adjusting needle valve body is located in the eccentric self-adjusting needle valve body shell, the eccentric self-adjusting needle valve body is located in the eccentric self-adjusting nozzle body, the pressure control type oil return hole lower section is arranged in the eccentric self-adjusting middle block, the lower end of the eccentric self-adjusting middle block is connected with the eccentric self-adjusting valve block, the top of the eccentric self-adjusting needle valve body is located in the eccentric self-adjusting valve block, an eccentric self-adjusting control cavity is formed among the eccentric self-adjusting needle valve body, the eccentric self-adjusting valve block and the eccentric self-adjusting middle block, the eccentric self-adjusting control cavity communicates with the pressure control type oil return hole lower section, an eccentric self-adjusting needle valve body protrusion is arranged in the middle of the eccentric self-adjusting needle valve body, an eccentric self-adjusting needle valve body reset spring is sleeved above the eccentric self-adjusting needle valve body protrusion, the eccentric self-adjusting needle valve body is of an eccentric structure, and one part of the eccentric self-adjusting needle valve body is attached to the inner wall of the eccentric self-adjusting needle valve body shell outside the eccentric self-adjusting needle valve body.

Eleventhly, the liquid ammonia phase-change cooling type hybrid power thermal management system further comprises a hydrogen fuel cell system, the hydrogen fuel cell system comprises a pile anode, a pile cathode, a hydrogen inlet, a nitrogen inlet and an air inlet, the hydrogen storage tank is connected with the hydrogen inlet, the nitrogen storage tank is connected with the nitrogen inlet, the hydrogen inlet and the nitrogen inlet are converged and then supplied to the pile anode through a hydrogen filter, a first shut-off valve, a high-pressure gas injection valve, a jet pump and hydrogen circulating pump, and waste gas of the pile anode passes through a water separator and is discharged through a drain valve and an exhaust valve respectively; and air passes through an air filter, an air compressor, a first intercooler, a humidifier and a second shut-off valve and then is supplied to the pile cathode.

Twelfthly, the liquid ammonia phase-change cooling type hybrid power thermal management system further comprises a cooling system and a second cooling unit, the cooling system comprises a water tank, a first radiator, a first deionizer, a first heater, a second intercooler and a first cooling connector, the first radiator, the first deionizer, the first heater, the second intercooler and the first cooling connector are connected in parallel to form a first cooling unit, the water tank is connected with the first cooling unit, the cooling connector is connected with a cooling water outlet, and the first cooling unit is connected with the outlet through a discharge valve; and the second cooling unit is symmetrically arranged with the first cooling unit, the second cooling unit comprises a second radiator, a second deionizer, a second heater, a third intercooler and a second cooling connector, and the arrangement mode of the second cooling unit is the same as and symmetrical with that of the first cooling unit.

Thirteenthly, the liquid ammonia phase-change cooling type hybrid power thermal management system further comprises a double-acting heat pump, the double-acting heat pump comprises a liquid ammonia inlet, a three-way valve, a low-power compressor, a high-power compressor, a refrigerating heat exchanger, a heating heat exchanger and a third radiator, the liquid ammonia storage tank is connected with the liquid ammonia inlet, the liquid ammonia inlet is connected with the three-way valve, high-pressure steam at an outlet of the low-power compressor is introduced into the third radiator, and after being condensed, the high-pressure steam enters the refrigerating heat exchanger through a first electronic expansion valve and a second electronic expansion valve and returns to the low-power compressor; high-pressure steam at an outlet of the high-power compressor enters the heating heat exchanger for condensation and heat release, enters branch circuits where the expansion valves are located through a one-way check valve and the first electronic expansion valve, and a liquid working medium in the branch circuits where the expansion valves are located is evaporated into a gaseous working medium and returns to the high-power compressor.

Fourteenthly, the liquid ammonia phase-change cooling type hybrid power thermal management system further comprises a liquid ammonia-diesel oil dual-fuel cylinder, the liquid ammonia-diesel oil dual-fuel cylinder comprises a cylinder body, a piston, a crank, an air inlet pipe and an exhaust pipe, the air inlet pipe, the air outlet pipe and the injector are arranged above the cylinder body, the piston is arranged in the cylinder body, the crank is connected below the piston, an air inlet is formed in the joint of the air inlet pipe and the cylinder body, an air inlet valve rod is arranged at the air inlet and sleeved with an air inlet valve rod spring, an air outlet is formed in the joint of the air outlet pipe and the cylinder body, the air outlet is provided with an air outlet valve rod, the air outlet valve rod is sleeved with an air outlet valve rod spring, the air inlet pipe is provided with a hydrogen gas inlet, an air gas inlet is arranged between the hydrogen gas inlet and the air inlet, and a safety valve is arranged between the hydrogen gas inlet and the air gas inlet.

The liquid ammonia phase-change cooling type hybrid power thermal management system has the following advantages:

firstly, the liquid ammonia-diesel oil dual-fuel integrated design is adopted, the installation space is saved, injection of an ammonia fuel injector and a diesel oil injector is controlled while diesel oil is supplied, and fuel oil pressurization is provided for the diesel oil injector and a pressurizer;

secondly, accurate control of ammonia fuel injection is ensured by adopting the super-hysteresis electromagnetic control actuator structure; and the pressure balance type electromagnetic control actuator and the super-atomization nozzle module are matched to spray into the cylinder, so that ammonia fuel is sprayed into the cylinder in a high-flow high-pressure liquid state, and sufficient combustion is realized;

thirdly, the injection process is combined with thermal management design, and phase-change conversion of ammonia fuel is adjusted and controlled from two aspects of pressure and temperature;

fourthly, the liquid ammonia spraying process is circularly variable in a multi-valve cooperative control mode, so that the spraying amount and the spraying timing are more accurate and flexible;

fifthly, the pressure fluctuation in the system is adjusted by adopting the resonance block, and the controllability of the pressure wave coupling process is realized by changing the phase of pressure wave fluctuation, adjusting the fluctuation frequency and the corresponding relation between wave crests and wave troughs; and meanwhile, a flow limiter is designed to prevent abnormal injection;

sixthly, a balance valve control mode is adopted, and higher common rail pressure (250 MPa) can be achieved due to the fact that the whole valve is soaked in high-pressure fuel oil and is subjected to the effect of balance force, so that the mass of the whole valve is reduced, namely, the electromagnetic force requirement is reduced, and control response is increased; therefore, only a small-size electromagnetic valve is needed to be matched with the armature, and small spring pre-tightening force is needed; and meanwhile, the adopted balance valve rod is not directly subjected to high impact, the cavitation erosion phenomenon of a traditional ball valve is prevented, and the system reliability is improved; and seventhly, through the combined design of the middle block and the self-adjusting valve block, on one hand, the problem of leakage caused by no static block in the prior art is solved, and on the other hand, through the design of the self-adjusting valve block, the problems of abrasion and leakage caused by needle valve eccentricity are prevented.

DETAILED DESCRIPTION OF THE EMBODIMENTS

Figure 1:
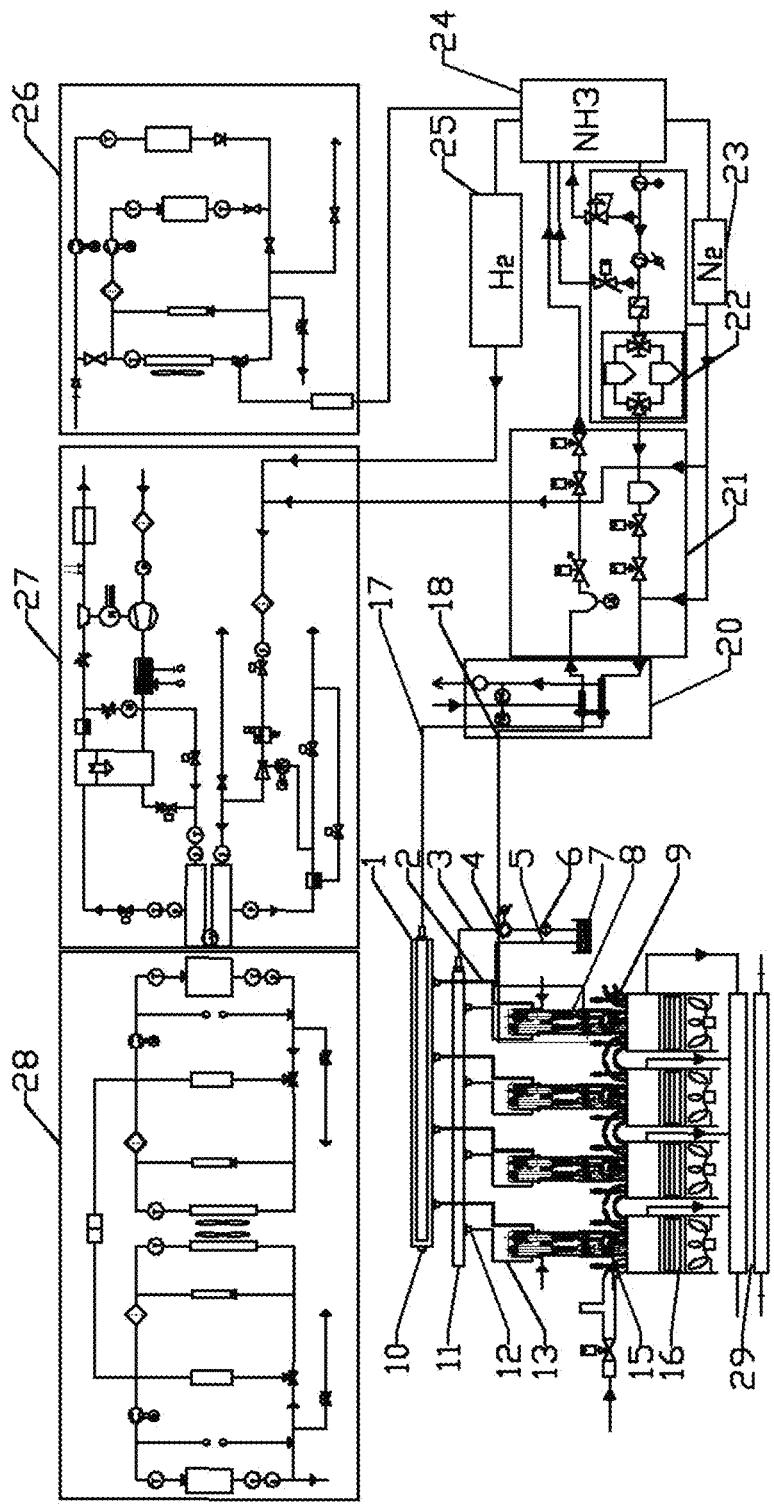
FIG. 1 is an integral structural schematic diagram of the present disclosure.

The present disclosure is described in more detail with reference to the attached figures.

In combination with FIG. 1 to FIG. 17, FIG. 1 is an integral structural schematic diagram of the present disclosure. A liquid ammonia phase-change cooling type hybrid power thermal management system comprises a fuel oil supply system, a liquid ammonia and hydrogen supply system, a liquid ammonia-diesel oil dual-fuel cylinder 16, a liquid ammonia-diesel oil dual-fuel injector 8, a hydrogen fuel cell supply system 27, a cooling system 28, a double-acting heat pump 26 and a waste heat utilization system 29. The fuel oil supply system comprises an oil tank 7, a filter 6, a high-pressure oil pump and motor 4, a fuel oil common rail pipe 11, a flow limiter 12, high-pressure oil pipes 3 and 13 and an injector 8, the right end of the common rail pipe 11 respectively communicates with the high-pressure oil pump 4, the filter 6 and the oil tank 7, and the flow limiter 12 communicates with the injector 14 through the high-pressure oil pipe 13.

Figure 2:
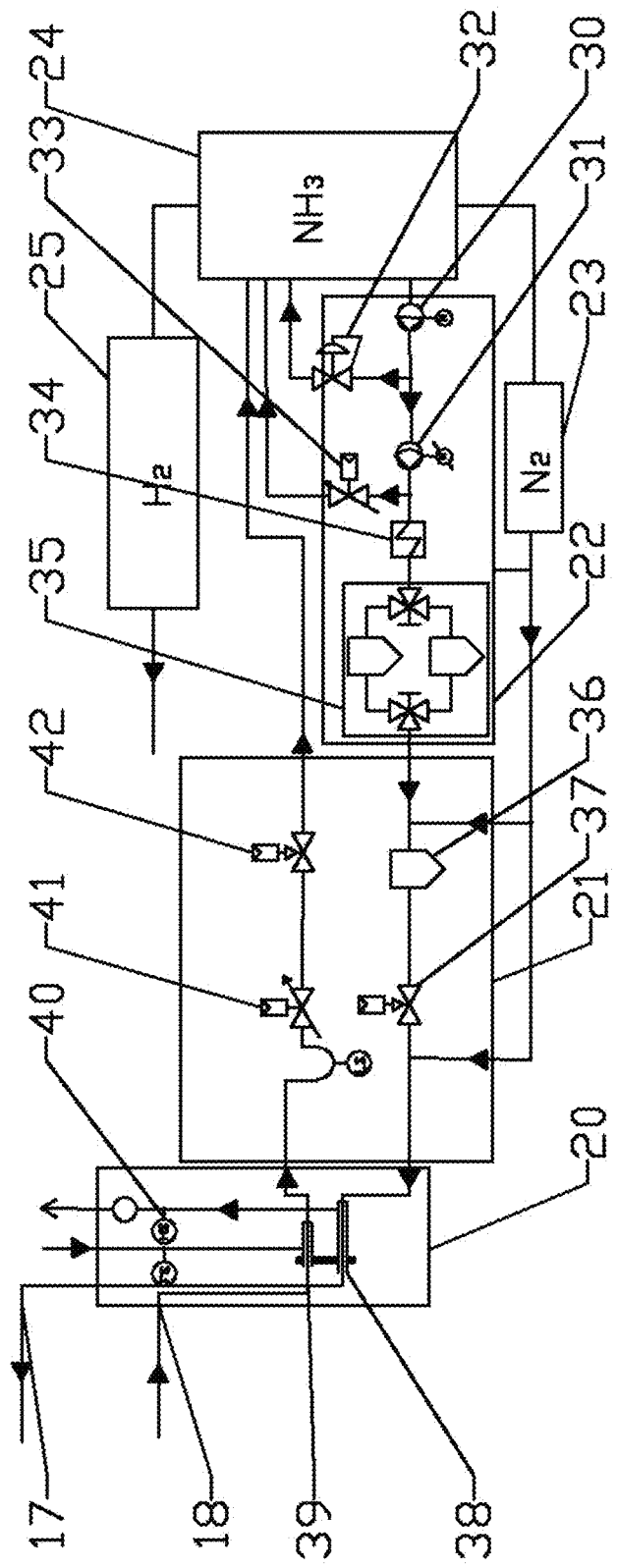
FIG. 2 is a liquid ammonia and hydrogen gas supply system.

FIG. 2 is a schematic diagram of a liquid ammonia and hydrogen gas supply system. The liquid ammonia and hydrogen gas supply system comprises a liquid ammonia storage tank 24, a hydrogen storage tank 25, a nitrogen storage tank 23, an ammonia pumping system 22, a flow dividing system 21, an ammonia inlet and outlet system 20, an ammonia inlet pipe 17, an ammonia return pipe 18, a liquid ammonia common rail pipe 1, a liquid ammonia leakage detection port 10, a high-pressure ammonia pipe 2 and a liquid ammonia injector 8. The ammonia pumping system 22 is composed of a low-pressure pump 30 and motor, a high-pressure pump 31 and motor, an overflow valve 32, a safety valve 33, a temperature controller 34, a liquid ammonia storage flow divider 35, a storage tank 36, an ammonia inlet control valve 37, an ammonia inlet 38, an ammonia return port 39, a regulation and control block 40, a safety valve 41 and an ammonia outlet control valve 42.

Figure 3:
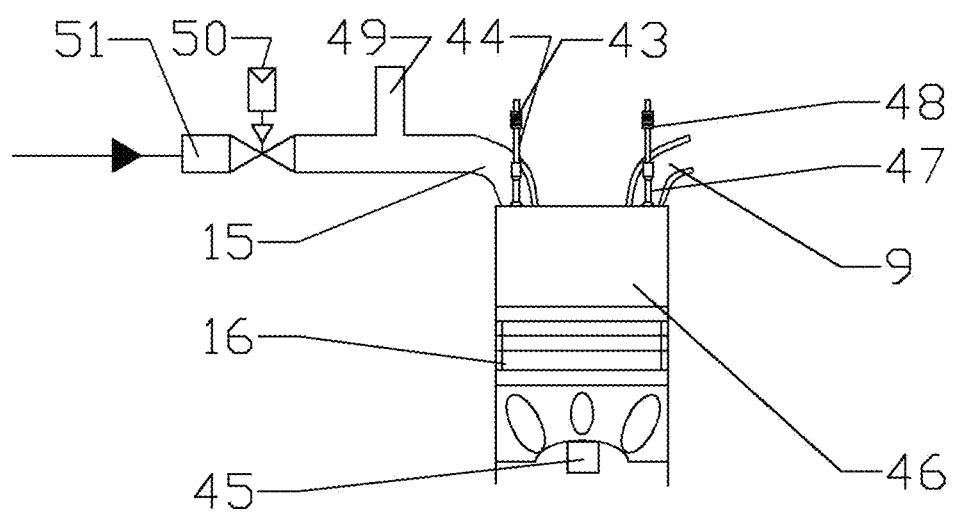
FIG. 3 is a schematic diagram of a liquid ammonia-diesel oil dual-fuel cylinder.

FIG. 3 is a schematic diagram of a liquid ammonia-diesel oil dual-fuel cylinder. The schematic diagram of a liquid ammonia-diesel oil dual-fuel cylinder mainly comprises a crank 45, a piston 16, a cylinder 46, an air inlet 15, an air inlet valve rod 44, an air inlet valve rod spring 43, an air outlet 9, an air outlet valve rod 47, an air outlet valve rod spring 48, a hydrogen gas inlet 51, a safety valve 50 and an air gas inlet 49.

Figure 4:
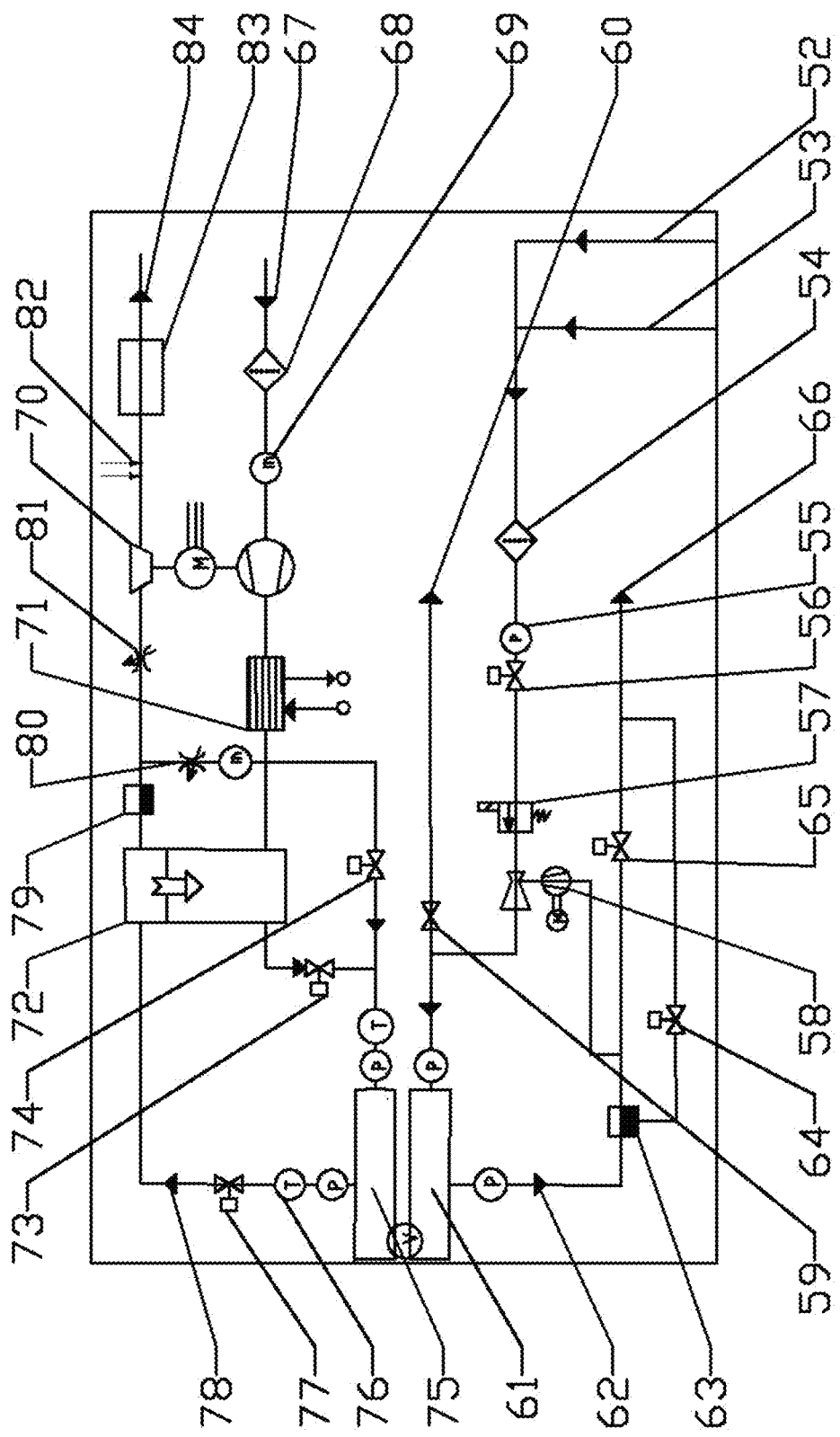
FIG. 4 is a schematic diagram of a hydrogen fuel cell supply system.

FIG. 4 is a schematic diagram of a hydrogen fuel cell supply system. The hydrogen fuel cell supply system mainly comprises a hydrogen inlet 52, a nitrogen purging inlet 53, a hydrogen filter 54, a pressure sensor 55, a shut-off valve 56, a high-pressure gas injection valve 57, a jet pump and hydrogen circulating pump 58, an overpressure valve 59, introduced air tail gases 60 and 66, a pile anode 61, an outlet 62, a water separator 63, a drain valve 64, an exhaust valve 65, an air inlet 67, an air filter 68, a sensor 69, an air compressor 70, an intercooler 71, a humidifier 72, a shut-off valve 73, a bypass valve 74, a pile cathode 75, a sensor 76, a shut-off valve 77, an outlet 78, a water separator 79, throttle valves 80 and 81, anode excess hydrogen 82, a muffler 83 and an outlet 84.

Figure 5:
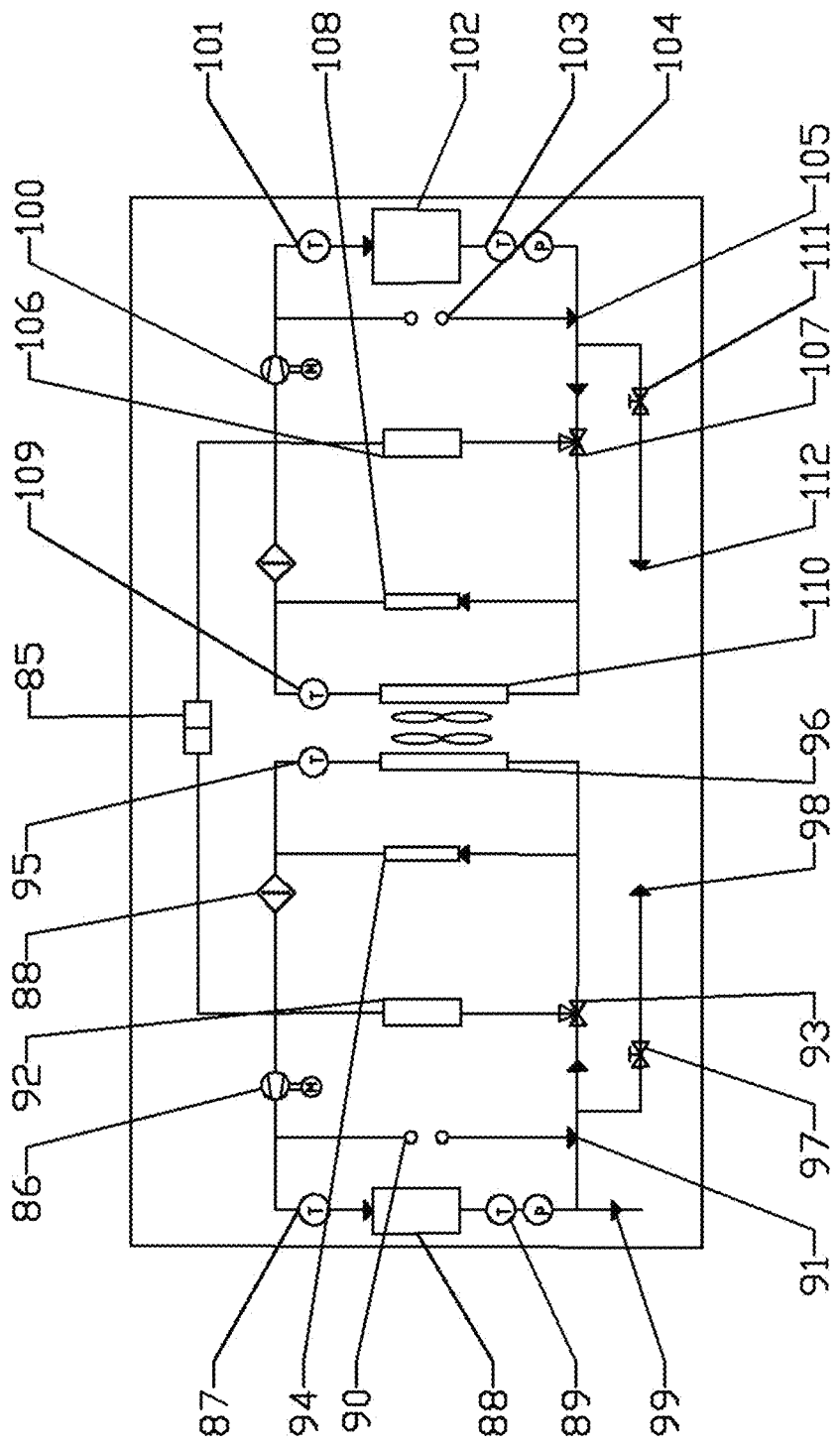
FIG. 5 is a schematic diagram of a cooling system.

FIG. 5 is a schematic diagram of a cooling system. The cooling system mainly comprises a water tank 85, cooling water pumps 86 and 100, temperature sensors 87 and 101, cooling connectors 88 and 102, temperature and pressure sensors 89 and 103, intercoolers 90 and 104, heaters 92 and 106, three-way valves 93 and 107, deionizers 94 and 108, sensors 95 and 109, radiators 96 and 110, discharge valves 97 and 111, outlets 91, 98, 105 and 112 and cooling water outlets 99 and 112.

Figure 6:
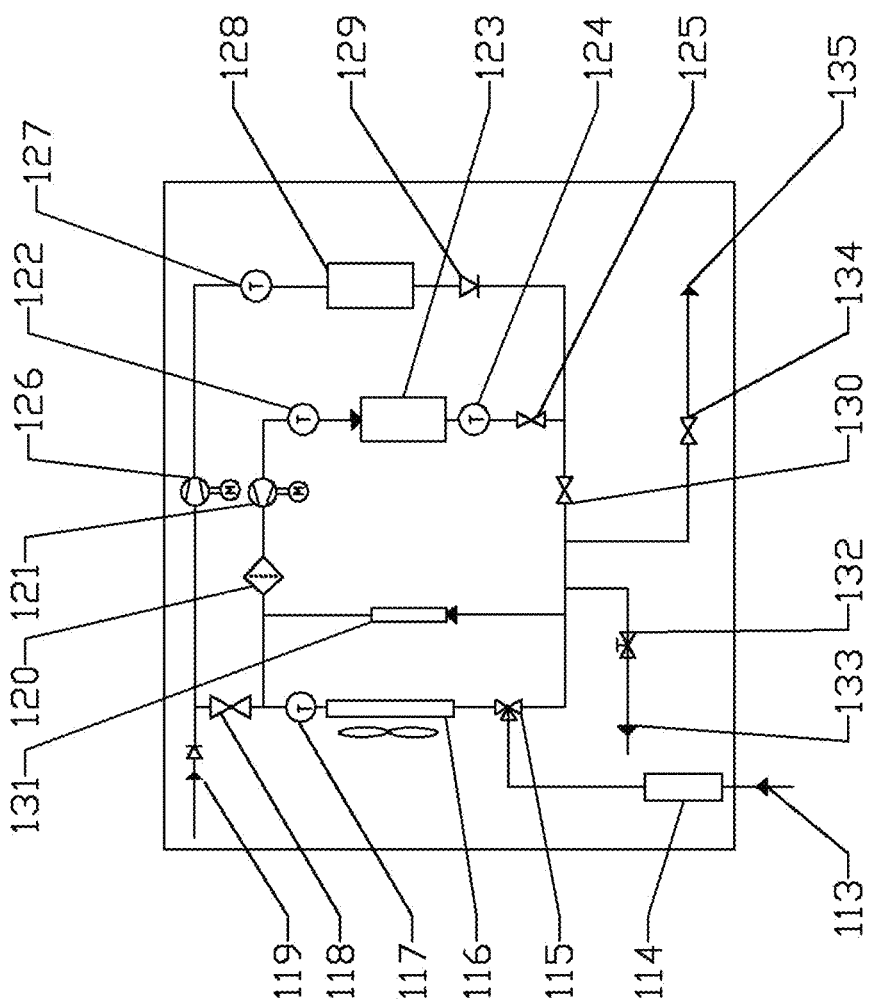
FIG. 6 is a schematic diagram of a double-acting heat pump and a waste heat utilization system.

FIG. 6 is a schematic diagram of a double-acting heat pump and a waste heat utilization system, and the double-acting heat pump and the waste heat utilization system mainly comprise a liquid ammonia inlet 113, a heater 114, a three-way valve 115, a radiator 116, a sensor 117, an electromagnetic reversing valve 118, a gaseous working medium 119, a filter 120, a low-power compressor 121, a sensor 122, a refrigerating heat exchanger 123, a sensor 124, an electronic expansion valve 125, a high-power compressor 126, a sensor 127, a heating heat exchanger 128, a one-way check valve 129, an electronic expansion valve 130, a deionizer 131, an ammonia discharge valve 132, a waste working medium 133, an expansion valve 134 and a liquid working medium 135.

Figure 7:
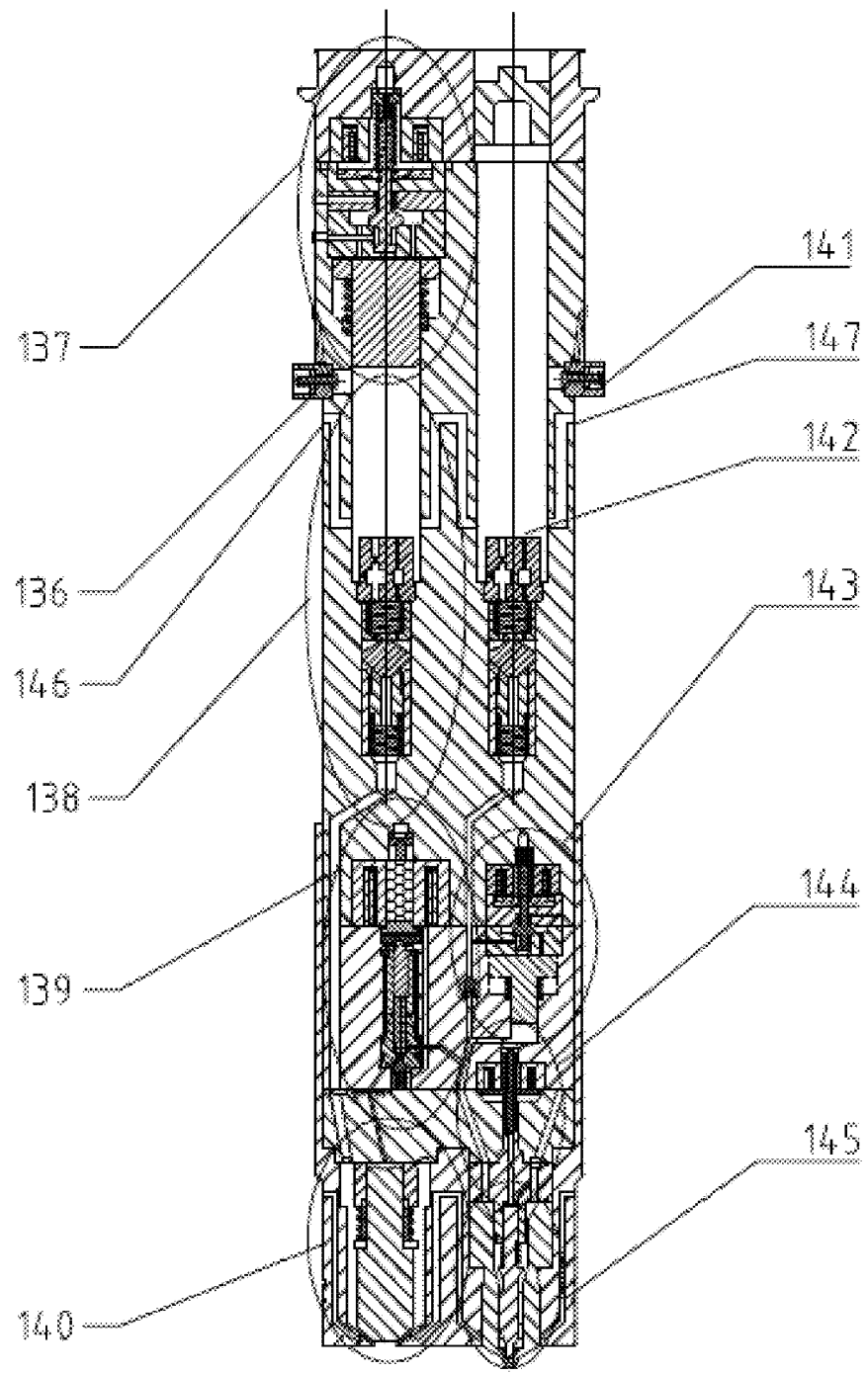
FIG. 7 is an integral structural schematic diagram of a liquid ammonia-diesel oil dual-fuel integrated injector.

FIG. 7 is an integral structural schematic diagram of a liquid ammonia-diesel oil dual-fuel integrated injector, and the liquid ammonia-diesel oil dual-fuel integrated injector mainly comprises a one-way ammonia inlet 136, a pressurizing module 137, pressure storage resonance flow-limiting modules 138 and 142, a super-hysteresis electromagnetic control actuator 139, a phase-change controllable super-atomization nozzle module 140, a one-way oil inlet 141, an auxiliary pressurizing module 143, a pressure balance type electromagnetic control actuator 144, a needle valve eccentric self-adjusting nozzle 145 and liquid ammonia thermal management modules 146 and 147 Ammonia fuel is injected into the cylinder in a high-pressure liquid state, and sufficient combustion is achieved. Meanwhile, the injection process is combined with thermal management design, and phase-change conversion of ammonia fuel is adjusted and controlled from two aspects of pressure and temperature. The liquid ammonia spraying process is circularly variable in a double-valve control mode, so that the spraying amount and the spraying timing are more accurate and flexible.

Figure 8:
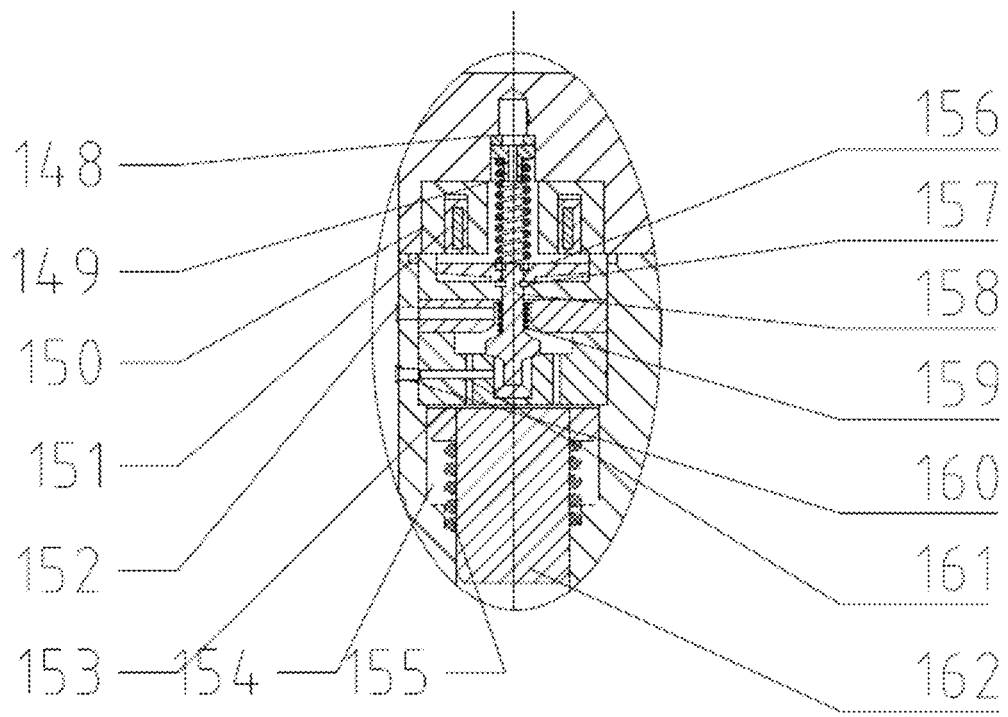
FIG. 8 is a structural schematic diagram of a pressurizing module.

FIG. 8 is a structural schematic diagram of an injector pressurizing module. The pressurizing module comprises a magnet yoke 148, a reset spring 149, main and auxiliary magnetic poles 150, a coil 151, an ammonia return channel 152, a pressurizing piston upper surface 153, a middle cavity 154, a pressurizing piston reset spring 155, an armature 156, a limited block 157, a valve rod reset spring 159, a double-sealing valve rod 158, an ammonia inlet channel 160, a middle pipeline 161 and a pressurizing piston lower surface 162. The module can adopt two control modes, one mode is a mode of pressurizing liquid ammonia by liquid ammonia, and the other mode is a mode of pressurizing liquid ammonia by diesel oil.

Figure 9:
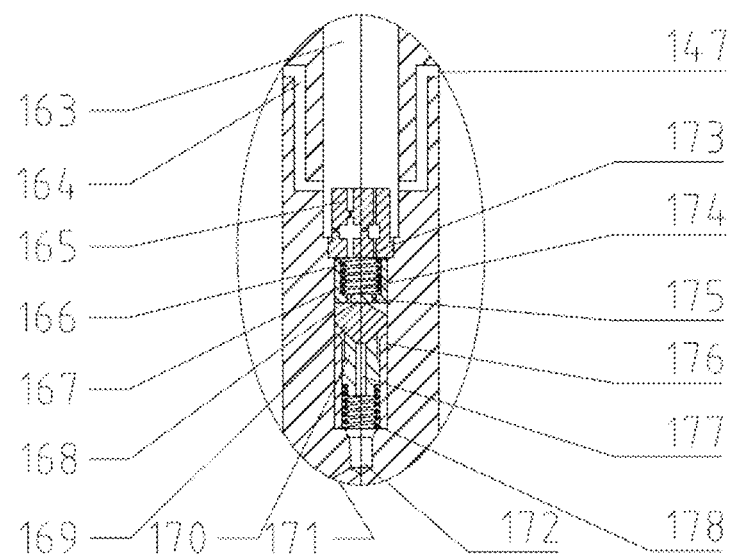
FIG. 9 is a structural schematic diagram of a pressure storage resonance flow-limiting module.

FIG. 9 is a structural schematic diagram of a pressure storage resonance flow-limiting module, and the pressure storage resonance flow-limiting module mainly comprises a pressure storage cavity 163, a liquid cooling pipe inlet 164, a resonance block 165, a middle block 166, a reset spring 167, an ammonia inlet hole 168, a prismatic sealing block 169, a flow-limiting piston 170, an ammonia inlet channel 171, a storage cavity 172, a resonance block ammonia inlet channel 173, a middle cavity 174, a resonance block ammonia inlet channel throttling hole 175, a valve seat 176, a middle hole 177 and a reset spring 178. The stability of ammonia fuel is ensured through the module, the pressure fluctuation in the system is adjusted by adopting the resonance block, and meanwhile, the flow limiter is designed to prevent abnormal injection.

Figure 10:
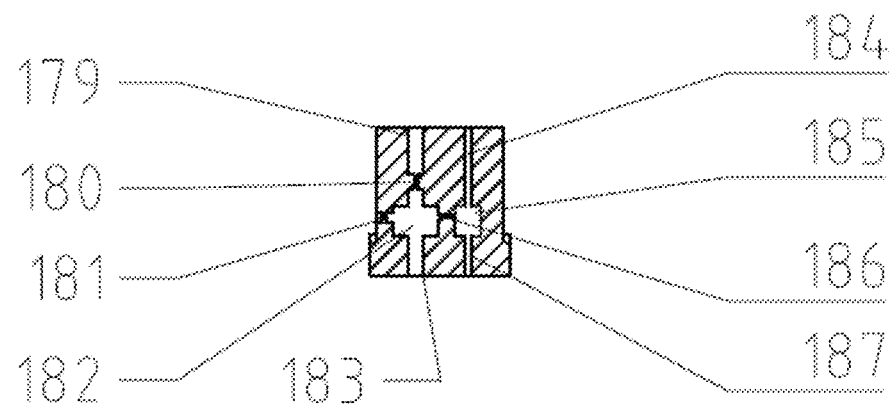
FIG. 10 is a structural schematic diagram of a resonance block.

FIG. 10 is a schematic diagram of a resonance block, and the resonance block mainly comprises a first ammonia inlet path 179, a first ammonia inlet throttling hole 180, a second ammonia inlet throttling hole 181, a first ammonia inlet cavity 182, a first ammonia outlet path 183, a second ammonia inlet path 184, a second ammonia inlet cavity 185, a communicating hole 186 and a second ammonia outlet path 187.

Figure 11:
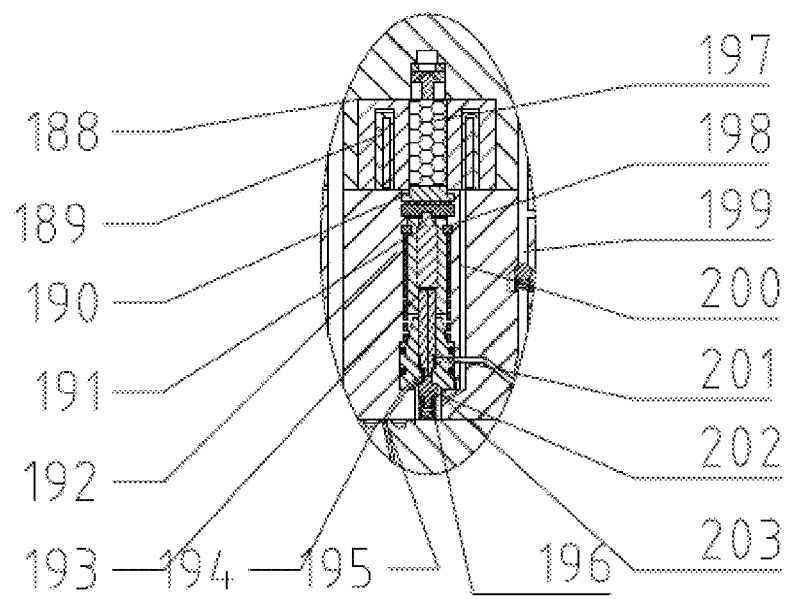
FIG. 11 is a structural schematic diagram of a super-hysteresis electromagnetic control actuator.

FIG. 11 is a schematic diagram of a super-hysteresis electromagnetic control actuator, and the super-hysteresis electromagnetic control actuator mainly comprises main and auxiliary magnetic poles 188, a coil 189, a hysteresis seat 190, an upper valve rod 191, a reset spring 192, a valve rod middle cavity 193, a buffer cavity 194, an oil inlet and return hole 195, a reset spring 196, a super-hysteresis material 197, a limited block 198, an oil inlet oil channel 199, an oil return oil channel 200, a lower end cone valve 201, a poppet valve 202 and an oil return oil channel 203.

Figure 12:
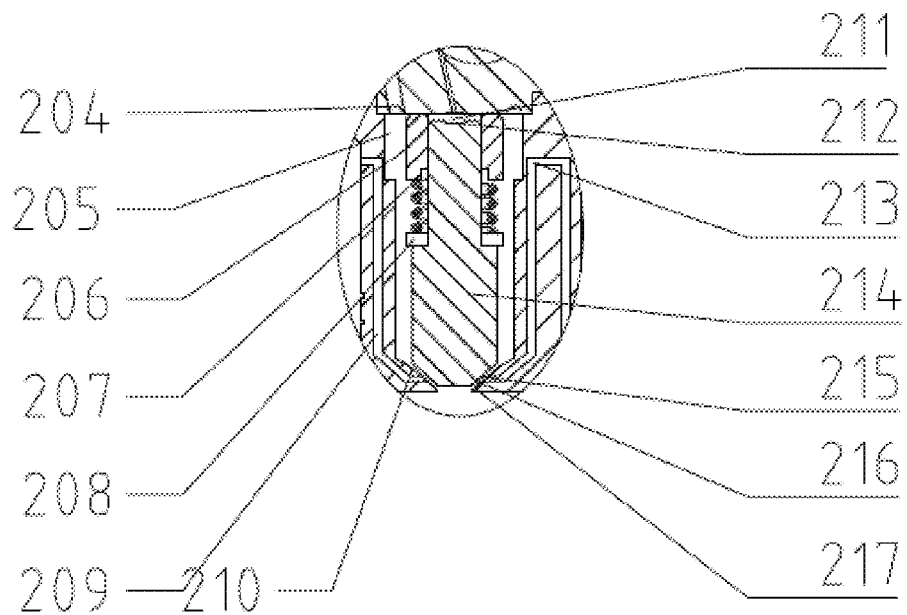
FIG. 12 is a structural schematic diagram of a phase-change controllable super-atomization nozzle module.

FIG. 12 is a schematic diagram of a phase-change controllable super-atomization nozzle module, and the phase-change controllable super-atomization nozzle module mainly comprises an ammonia inlet pipeline 204, an ammonia storage cavity 205, a static leakage-free cylinder 206, a reset spring 207, a gasket 208, a liquid cooling working medium inlet pipeline 209, a valve seat 210, a control cavity 211, a control valve rod upper end surface 212, a liquid cooling working medium outlet pipeline 213, a needle valve body 214, a needle valve sealing surface 215, an injection flow channel 216 and a nozzle body 217.

Figure 13:
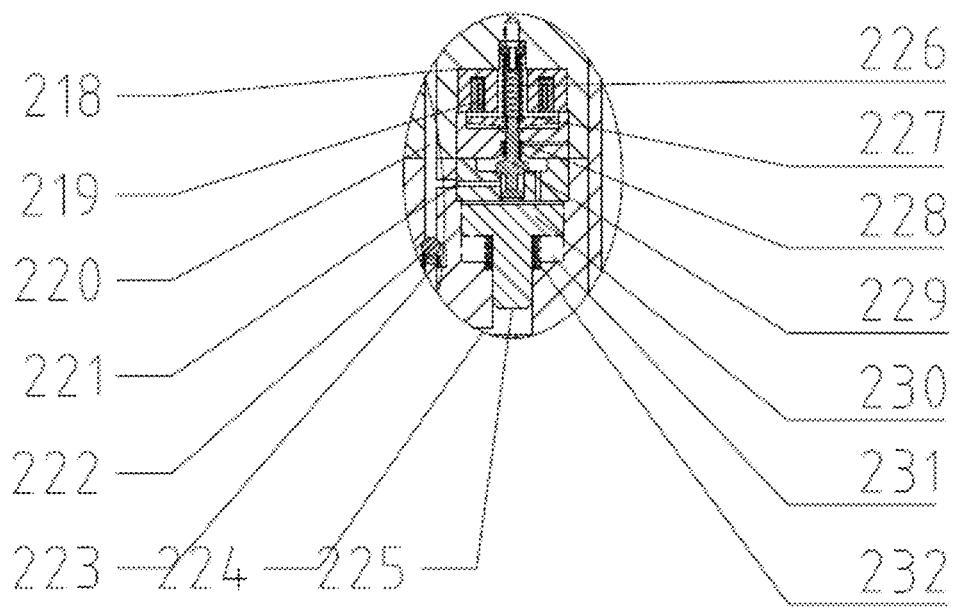
FIG. 13 is a structural schematic diagram of an auxiliary pressurizing module.

FIG. 13 is a schematic diagram of an auxiliary pressurizing module, and the auxiliary pressurizing module mainly comprises main and auxiliary magnetic poles 218, a coil 219, an oil inlet channel 220, a middle pipeline 221, a sealing ball 222, a reset spring 223, a pressurizing oil pipeline 224, a pressurizing piston lower surface 225, a valve rod reset spring 226, an armature 227, an oil return pipeline 228, a double-sealing valve rod 229, a pressurizing piston upper surface 230, a middle cavity 231 and a pressurizing piston reset spring 232.

Figure 14:
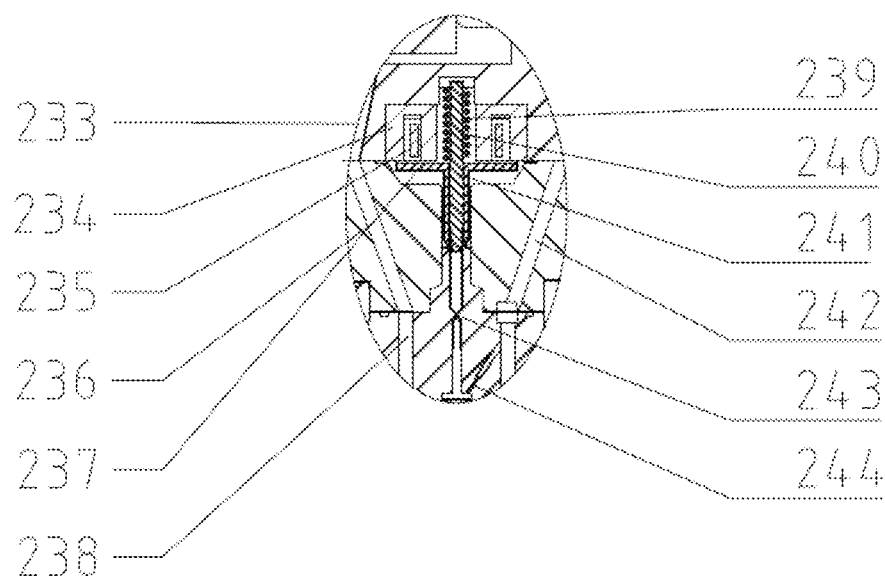
FIG. 14 is a structural schematic diagram of a pressure balance type electromagnetic control actuator.

FIG. 14 is a schematic diagram of a pressure balance type electromagnetic control actuator, and the pressure balance type electromagnetic control actuator mainly comprises an oil inlet pipe 233, main and auxiliary magnetic poles 234, a coil 235, an armature 237, oil inlet pipelines 233, 236 and 238, reset springs 239 and 240, a balance valve rod 241, an oil inlet pipe 242, an oil return throttling hole 243 and an oil inlet throttling hole 244.

Figure 15:
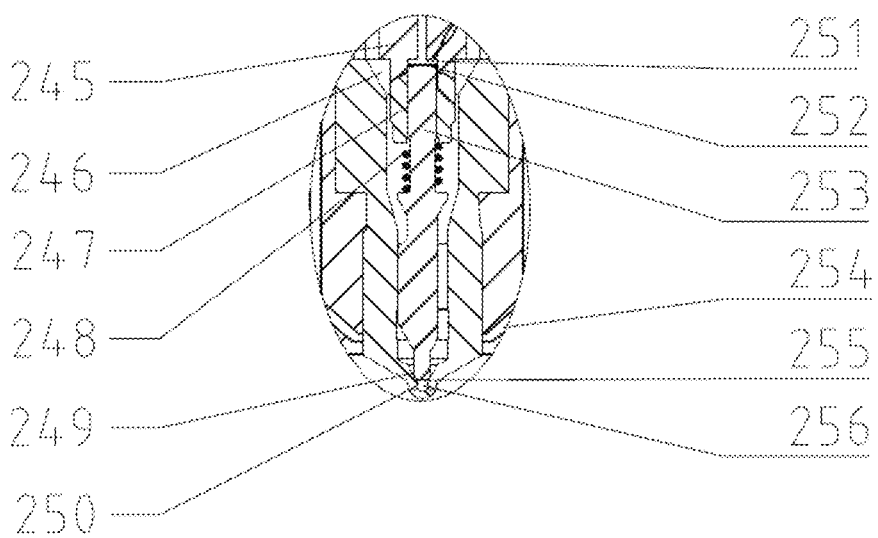
FIG. 15 is a structural schematic diagram of a needle valve eccentric self-adjusting nozzle module.

FIG. 15 is a schematic diagram of a needle valve eccentric self-adjusting nozzle module, and the needle valve eccentric self-adjusting nozzle module mainly comprises a middle block 245, an oil accommodating groove 246, a self-adjusting valve block 247, a reset spring 248, a needle valve lower end surface 249, a nozzle hole 250, a control cavity 251, a control valve rod upper end surface 252, a needle valve body 253, a nozzle body 254, a needle valve sealing surface 255 and a nozzle seat surface 256.

Figure 16:
FIG. 16 is a three-dimensional sectional structural schematic diagram of a phase-change controllable super-atomization nozzle module.
Figure 17:
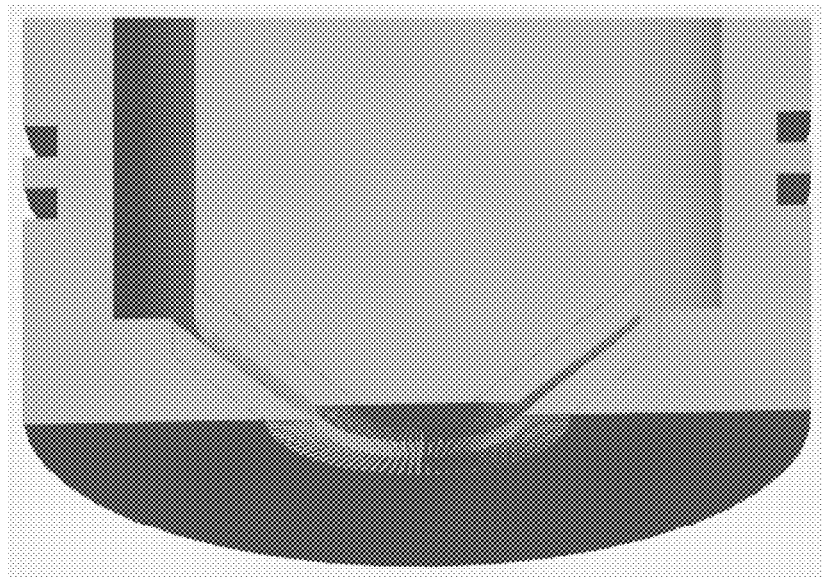
FIG. 17 is a three-dimensional integral structural schematic diagram of a phase-change controllable super-atomization nozzle module.

FIG. 16 and FIG. 17 show a super-atomization nozzle designed with an inner cone structure as a whole to achieve multi-layer sealing. Meanwhile, nearly hundreds of nozzle holes are used for spraying, and sufficient atomization of fuel is guaranteed from the structural angle. Fuel and air are fully fused and completely combusted.

Fuel of the system is stored in the liquid ammonia storage tank 24, and the ammonia fuel is guaranteed to be in a stable liquid state in a high-pressure and low-temperature storage mode. Meanwhile, at the initial stage of fuel supply, a hydrogen and nitrogen preparation module is set up, stored liquid ammonia is converted into ammonia gas, and then purified ammonia gas is used for preparing hydrogen required by combustion and nitrogen required by system purging. The hydrogen and the nitrogen are respectively stored in the hydrogen storage tank 25 and the nitrogen storage tank 23. Liquid ammonia stored in the liquid ammonia storage tank 24 firstly passes through the ammonia pumping system 22 and is pressurized by a low-pressure pump and a high-pressure pump, so that the requirements of supply and combustion are met. Wherein, the overflow valve 32 and the safety valve 33 are respectively arranged in a low-pressure loop and a high-pressure loop. The overflow valve 32 is arranged in the low pressure loop to control the delivery pressure, and when the pressure is too high, excess liquid ammonia is returned to the liquid ammonia storage tank 24 through the overflow valve 32. The safety valve 33 is arranged in the high-pressure loop to control the high-pressure fuel delivery pressure, the output pressure is adjusted through active control, and excess liquid ammonia returns to the liquid ammonia storage tank 24 through the safety valve 33. For liquid ammonia, which is a phase-change-prone fuel, a thermal management module needs to be provided, and the temperature controller 34 is used for adjusting the temperature of the liquid ammonia output to control the phase state of the ammonia fuel by both pressure and temperature. Then, the fuel enters the liquid ammonia storage flow divider 35, stable supply of the fuel is guaranteed through comprehensive control of double valves and double accommodating cavities, then the fuel is supplied into the ammonia inlet 38 through the storage tank 36 and the ammonia inlet control valve 37, and then the fuel is guided into the liquid ammonia common rail pipe 1. The ammonia inlet control valve 37 is configured for controlling the inlet of ammonia, and the ammonia outlet control valve 42 is configured for controlling the outlet of ammonia. The liquid ammonia common rail pipe 1 in the system is of a double-layer structure, and liquid ammonia is prevented from leaking into the atmosphere. Meanwhile, an ammonia leakage detection sensor is arranged at the port of the common rail pipe, and system feedback is carried out in time. Liquid ammonia in the liquid ammonia common rail pipe 1 is supplied to the liquid ammonia injector 8 through the double-layer high-pressure ammonia pipe 2, is controlled by the electromagnetic valve in the injector and then is injected into the cylinder.

Diesel oil used for ignition in the system is stored in the oil tank 7, the high-pressure oil pump 4 sucks fuel oil from the oil tank 7, the filter 6 is arranged between the high-pressure oil pump 4 and the oil tank 7, and the fuel oil is filtered through the filter 6. And then the fuel oil is conveyed to the common rail pipe 11, a plurality of hydraulic oil outlets are formed in the common rail pipe 11, each hydraulic oil outlet communicates with the injector through the high-pressure oil pipe 13, and the hydraulic oil is controlled by the electromagnetic valve in the injector and then is ejected into the cylinder.

Liquid ammonia fuel enters the pressure storage cavity 163 from the one-way ammonia inlet 136, and the one-way ammonia inlet 136 plays a role of a one-way valve. When liquid ammonia supply pressure is larger than spring pre-tightening force of the one-way valve, the cone valve overcomes spring force to be opened, and liquid ammonia is supplied into the pressure storage cavity. And when the pressure of the one-way ammonia inlet 136 is small, the cone valve is closed again, and the liquid ammonia in the system is also sealed. After entering the pressure storage cavity 163, the fuel is supplied downwards through the resonance block 165. The resonance block 165 is composed of three pipelines 179, 181 and 184. Fuel flows into the flow limiter from the three pipelines respectively, the first ammonia inlet pipeline 179 is a main flow channel, flows through the first ammonia inlet throttling hole 180 in the middle, plays a role in filtering liquid ammonia, and then flows into the first ammonia inlet cavity 182. The second ammonia inlet path 184 is an auxiliary flow path, no throttling hole is formed in the middle, and the second ammonia inlet path 184 directly flows into the flow limiter after passing through the second ammonia inlet cavity 185 and the second ammonia outlet path 187. The second ammonia inlet throttling hole 181 and the communicating hole 186 are main structures for realizing resonance, and the controllability of the pressure wave coupling process is realized by changing the phase of the pressure wave fluctuation, adjusting the fluctuation frequency and the corresponding relation between wave crests and wave troughs. Particularly, in a pressurizing mode, the stability of the system is ensured. The flow-limiting valve assembly is arranged inside the injector body through the pressure storage cavity 163. The middle block 166 not only limits the overall flow-limiting valve assembly, but also cooperates with the reset spring 167 to serve as a spring seat of the reset spring 167 on one hand, and limits the maximum displacement of the flow-limiting piston on the other hand. Under the action of spring pre-tightening force of a damping spring and a ball valve reset spring, the lower end surfaces of the prismatic sealing block 169 and the flow-limiting piston 170 are matched with the upper end surface of a supporting control valve seat 176. The valve seat 176 is pressed at the bottom under the action of spring force of the reset spring, and a seating surface of the prismatic sealing block is formed at the variable cross section of the upper portion of the valve seat 176. Liquid ammonia flows into the middle cavity 174 from the resonance block and flows into the flow-limiting valve through the oil inlet hole 168 and the resonance block ammonia inlet path throttling hole 175 respectively. Under the action of hydraulic force, along with liquid ammonia supply, the prismatic sealing block 169 overcomes spring force to move downwards. When the fuel supply amount is higher than a limit value, the prismatic sealing block 169 is matched with the valve seat 176 to achieve sealing, fuel supply is disconnected, and cylinder pulling is avoided. When fuel supply is interrupted, the prismatic sealing block 169 rapidly resets under the action of the spring force.

Diesel enters the pressure storage resonance flow-limiting module 138 through the one-way oil inlet 141, then is supplied downwards and enters the auxiliary pressurizing module 143, and the pressurized fuel is supplied to the super-hysteresis electromagnetic control actuator 139, the pressure balance type electromagnetic control actuator 144 and the needle valve eccentric self-adjusting nozzle 145 through the one-way valves 222 and 223 respectively for respectively controlling injection of the ammonia fuel injector and the diesel oil injector and providing fuel oil for the diesel oil injector.

Through the flow limiter, liquid ammonia is supplied into the ammonia storage cavity through the ammonia inlet channel, and is sprayed into the cylinder through the cooperation of the super-hysteresis electromagnetic control actuator and the super-atomization nozzle module. In the present disclosure, in order to ensure the control accuracy of the fuel injector, diesel oil is adopted as servo oil, and the upper and lower stress of the needle valve is changed by adjusting the pressure level in the control cavity, so that the injection timing is controlled. High-pressure diesel oil flows into the electromagnetic actuator from the oil inlet oil channel 199, and when the electromagnetic actuator is not powered on, under the action of spring pre-tightening force 192 and 196, the poppet valve 202 is in a sealed state, so that an electromagnetic actuator pipeline is disconnected from an oil return pipeline. When the lower end cone valve 201 is in an open state, diesel oil is supplied to the control cavity 211 from the oil inlet oil channel 199 through a flow channel of the lower end cone valve 201. By means of the oil inlet and return hole 195 and the buffer cavity 194, on one hand, fuel oil pressure fluctuation at the control valve is reduced through the buffer cavity, and on the other hand, leaked fuel oil is collected through the pressure difference of the high-pressure contact surface structure. Fuel oil flows downwards into the control cavity 211 and is sealed by the static leakage-free cylinder 206 and the needle valve sealing surface 215, and accurate control over fuel injection is realized by regulating and controlling the pressure in a control chamber and changing the upper and lower stress difference of the needle valve.

The diesel injector adopts a balance valve control mode, and the balance valve rod is compressed by the armature. Higher common rail pressure (250 MPa) can be achieved due to the fact that the whole valve is soaked in high-pressure fuel oil and is subjected to the effect of balance force, so that the mass of the whole valve is reduced, namely, the electromagnetic force requirement is reduced, and control response is increased. Therefore, only a small-size electromagnetic valve is needed to be matched with the armature, and small spring pre-tightening force is needed. Meanwhile, the adopted balance valve rod is not directly subjected to high impact, the cavitation erosion phenomenon of a traditional ball valve is prevented, and the system reliability is improved. High-pressure diesel oil flows into the control cavity 251 through the oil inlet oil channel 242 and the oil inlet throttling hole 244, and when the control cavity 251 is not powered on, under the action of the spring pre-tightening force 240, the armature 237 and the balance valve rod 241 are in a sealed state, so that the electromagnetic actuator pipeline is disconnected from the oil return pipeline. Diesel oil is supplied to the control cavity 251 from the oil inlet oil channel 242 through the flow channel of the oil inlet throttling hole 244. The fuel oil pressure fluctuation at the control valve is reduced due to the existence of the oil return cavity. Fuel oil flows downwards into the control cavity 251, and the control cavity is formed by combining the middle block 245, the self-adjusting valve block 247 and the control valve rod upper end surface 252 to achieve sealing. The pressure in the control chamber is regulated and controlled, the upper and lower stress difference of the needle valve is changed, and accurate control over fuel injection is achieved. Through the combined design of the middle block 245 and the self-adjusting valve block 247, on one hand, the problem of leakage caused by no static block in the prior art is solved, and on the other hand, through the design of the self-adjusting valve block, the problems of abrasion and leakage caused by needle valve eccentricity are prevented. The working principles of the main and auxiliary pressurizing modules are similar, and by taking the main pressurizing module as an example, the working principles of the pressurizing modules in the specific injection process are as follows:

When a non-pressurizing mode is adopted for working, the pressurizing control valve part is not powered on, and due to the fact that the pressure of each acting surface of the pressurizing piston is balanced at the moment, the acting armature 156 and the double-sealing valve rod 158 which are subjected to spring pre-tightening force 149 and 155 are in a compressed state, and the ammonia inlet channel 160 is sealed. At the moment, no fuel is supplied to the pressurizing module, and the pressurizing piston is in a reset state under the action of spring pre-tightening force and is free of pressurizing function. Therefore, ammonia fuel in the system is stored in the pressure storage cavity 163 after passing through the one-way ammonia inlet 136, and flows into the flow-limiting valve through a resonant cavity 165. Due to the throttling effect of the resonance block 165 on the liquid ammonia, the fuel pressure in the middle hole 177 in the flow-limiting piston 170 and the pressure storage cavity 163 rises to form pressure difference with the pressure in a transition oil cavity, and therefore the flow-limiting piston 170 and the prismatic sealing block 169 integrally move downwards to compensate the injected pressure to a certain extent. The liquid ammonia passing through the flow-limiting valve is supplied into the oil accommodating groove 246 through the ammonia inlet pipe. When the pressure balance type electromagnetic control actuator is powered on, under the influence of a magnetic field, the armature 237 overcomes spring pre-tightening force 239 and 240 to move upwards, an oil return channel is opened, the control cavity 251 communicates with the low-pressure leakage hole, and fuel in the control cavity 251 flows back into the low-pressure cavity through the low-pressure oil leakage hole. When the resultant force formed by the pressure in the control cavity 251 and the elastic force of a needle valve spring 248 is smaller than the upward hydraulic force in the oil accommodating groove 246, the needle valve body 253 is lifted upwards, the muzzle hole is opened, and the injector starts to spray oil. When the oil injection control valve part is powered off, the magnetic field influence is lost, the armature 237 moves downwards under the action of the pre-tightening force of the spring, and the oil return oil channel is sealed again. Meanwhile, the balance valve rod 241 is driven to move downwards, and sealing is achieved. The pressure of the control cavity 251 is re-built through the oil inlet throttling hole 244, and when the resultant force formed by the pressure in the control cavity 251 and the elastic force of the needle valve spring 248 is larger than the upward hydraulic force in the oil accommodating groove 246, the needle valve body 253 is re-seated, and the injector stops injecting. When the injector stops working, the pressure difference between the upper surface and the lower surface of the flow-limiting piston 170 is gradually reduced along with the liquid ammonia flowing through the middle hole 177, and the flow-limiting piston 170 and the prismatic sealing block 169 integrally return to the initial position under the action of the reset spring.

When a pressurizing mode is adopted for working, the pressurizing control valve is partially powered on, the coil 151 is powered on, the main and auxiliary magnetic poles 150 form electromagnetic force, the armature 156 is attracted to move upwards, meanwhile, the double-sealing valve rod 158 is driven to move upwards, the ammonia inlet channel 160 is opened, and the ammonia return channel is closed. Liquid ammonia is collected on the pressurizing piston upper surface 153 to increase the stress on the upper surface, so that the upper and lower pressure difference overcomes the spring force to cause the pressurizing piston to move downwards. The volume in the lower pressure storage cavity is compressed, and the pressure is increased. The pressurizing module and the pressure balance type electromagnetic control actuator can both adopt two control modes, one mode is a mode of pressurizing liquid ammonia by liquid ammonia, and the other mode is a mode of pressurizing liquid ammonia by diesel oil. In the pressurizing module, the middle cavity 154 may serve as a pressurizing oil leakage collection cavity, and meanwhile, the fuel oil may play a sealing role in the liquid ammonia. The pressurized liquid ammonia flows into the flow-limiting valve through the resonant cavity 165. Liquid ammonia passing through the flow-limiting valve is supplied into the ammonia storage cavity 205 through the ammonia inlet channel 171. When the pressure balance type electromagnetic control actuator 144 is powered on, under the influence of the magnetic field, the armature 237 overcomes spring pre-tightening force 239 and 240 to move upwards, the oil return channel is opened, the control cavity 251 communicates with the low-pressure leakage hole, and fuel in the control cavity 251 flows back into the low-pressure cavity through the low-pressure oil leakage hole. When the resultant force formed by the pressure in the control cavity 251 and the elastic force of a needle valve spring 248 is smaller than the upward hydraulic force in the oil accommodating groove 246, the needle valve body 253 is lifted upwards, the muzzle hole is opened, and the injector starts to spray oil. When the oil injection control valve part is powered off, the magnetic field influence is lost, the armature 237 moves downwards under the action of the pre-tightening force of the spring, and the oil return oil channel is sealed again. Meanwhile, the balance valve rod 241 is driven to move downwards, and sealing is achieved. The pressure of the control cavity 251 is re-built through the oil inlet throttling hole 244, and when the resultant force formed by the pressure in the control cavity 251 and the elastic force of the needle valve spring 248 is larger than the upward hydraulic force in the oil accommodating groove 246, the needle valve body 253 is re-seated, and the injector stops injecting.

Thermal management modules are designed at the pressure storage resonance flow-limiting module 138 and the super-atomization nozzle module 140, including an inlet and an outlet for a refrigerant. The liquid ammonia phase state is comprehensively controlled in two aspects of temperature and pressure, so that the liquid ammonia phase state in the injection process is controllable.

Ammonia and hydrogen are supplied to the hydrogen fuel cell system, hydrogen is supplied to the hydrogen inlet 52, purged through the nitrogen purging inlet 53, filtered by the hydrogen filter 54, and the circulation pressure is monitored by the pressure sensor 55, when the pressure demand is met, the shut-off valve 56 is opened, and when the pressure is excessive, the shut-off valve 56 is closed. The pile anode 61 is then supplied by the high-pressure gas injection valve 57 and the jet pump and hydrogen circulating pump 58. Exhaust gas of the pile anode 61 is discharged outwards through the water separator 63, the drain valve 64 and the exhaust valve 65. Air is filtered by the air filter 68 through the air inlet 67, the circulation pressure is monitored by the pressure sensor 69, and the air is pressurized and physically adjusted by the air compressor 70, the intercooler 71 and the humidifier 72, and is delivered to the shut-off valve 73 to be supplied to the pile cathode 75. Excess air supply is discharged by the bypass valve 74 along with exhaust gas of the pile cathode 75 passing through the humidifier 72, and through the throttle valves 80 and 81, anode excess hydrogen is collected, flows through the muffler 83, and is discharged through the outlet 84.

Cooling requirements of a fuel cell and a dual-fuel injection system in the system are met by the cooling system 28, in the system, cooling water in the water tank is an ethylene glycol solution, heat exchange fins are additionally arranged on the wall surface of the water tank, phase change is carried out by the branch circuit of ammonia 24 stored in the system, boiling heat exchange is achieved, and the solution in the water tank is primarily cooled. By utilizing the function of ammonia fuel as a refrigerant, the work done by the cooling water pumps 86 and 100 is greatly reduced. The cooled ethylene glycol solution is secondarily cooled by the cooling water pumps 86 and 100 to meet the cooling requirement of the system, the inlet air temperature is reduced by the intercoolers 90 and 104, ions in the solution are removed by the deionizers 94 and 108, and pure water is obtained. The temperature of the solution is adjusted by the heaters 92 and 106, and the treated cooling water passes through the cooling water outlets 99, 112 respectively to meet the cooling requirements of the heat engine and the fuel cell. Meanwhile, the two loops are connected in parallel, power can be adjusted according to requirements of different parts, and the refrigerating capacity can be adjusted.

Liquid ammonia passes through the heater 114 from the liquid ammonia inlet 113 into the three-way valve 115, and the three-way valve 115 plays a role of a diversion valve.

When the low-power compressor 121 works, high-pressure steam discharged by the compressor enters the radiator through the filter 120 and the sensor 117, after being condensed, the working medium enters the electronic expansion valves 130 and 125, enters the refrigerating heat exchanger 123 through the sensor 124 and is evaporated to absorb heat in the refrigerating heat exchanger 123 to achieve the refrigeration effect, and then returns to the low-power compressor through the sensor 122.

When switching to the heating mode, the system dissipates heat for the piston of the power system and related parts of the injector. High-pressure steam of the working medium is discharged from the high-power compressor 126, enters the heating heat exchanger 128 through the sensor 127 for condensation and heat release, then enters the branch circuit where the expansion valve 134 is located through the one-way check valve 129 and the electromagnetic expansion valve 130 and communicates with the heat exchanger, and after the liquid working medium 135 evaporates and absorbs heat from the piston part, the gaseous working medium 119 returns to the high-power compressor 126 through the one-way check valve, heating circulation is achieved, and piston set components are cooled.

The system can also realize an air source heating mode, the high-pressure steam of the working medium is discharged from the high-power compressor 126, enters the heating heat exchanger 128 through the sensor 127 for condensation and heat release, then enters the radiator 116 through the one-way check valve 129 and the electromagnetic expansion valve 130, and returns to the high-power compressor through the sensor 117 and the electromagnetic reversing valve 118 after evaporation and heat absorption of the working medium at the radiator 116, and air source heating circulation is realized.

According to the above description, the present disclosure realizes three purposes for ammonia: power device fuel supply, a heat dissipation system refrigerant and a hydrogen supply source of a fuel cell. The liquid ammonia-diesel oil dual-fuel integrated design is adopted, the installation space is saved, injection of the ammonia fuel injector and the diesel oil injector is controlled while diesel oil is supplied, and fuel oil is provided for the diesel oil injector. The double-acting heat pump module is innovatively designed based on the liquid ammonia phase-change cooling principle, firstly, the cold starting problem of the engine under the cold condition can be effectively solved, secondly, the power consumption of the compressor is reduced, waste heat utilization is achieved, and the energy utilization rate is improved. Meanwhile, the injection process is combined with thermal management design, and phase-change conversion of ammonia fuel is adjusted and controlled from two aspects of pressure and temperature. The liquid ammonia spraying process is circularly variable in a multi-valve cooperative control mode, so that the spraying amount and the spraying timing are more accurate and flexible. A main and auxiliary pressurizing mode can be adopted, under the pressurizing mode, the injection pressure and the injection rate of fuel injection are affected by the pressurizing mode, and controllable injection between cycles can be achieved. Accurate control of ammonia fuel injection is ensured by adopting the super-hysteresis electromagnetic control actuator structure. A balance valve control mode is adopted, and higher common rail pressure (250 MPa) can be achieved due to the fact that the whole valve is soaked in high-pressure fuel oil and is subjected to the effect of balance force, so that the mass of the whole valve is reduced, namely, the electromagnetic force requirement is reduced, and control response is increased. Therefore, only a small-size electromagnetic valve is needed to be matched with the armature, and small spring pre-tightening force is needed. Meanwhile, the adopted balance valve rod is not directly subjected to high impact, the cavitation erosion phenomenon of a traditional ball valve is prevented, and the system reliability is improved. Through the combined design of the middle block and the self-adjusting valve block, on one hand, the problem of leakage caused by no static block in the prior art is solved, and on the other hand, through the design of the self-adjusting valve block, the problems of abrasion and leakage caused by needle valve eccentricity are prevented.

What is claimed is:

1. A liquid ammonia phase-change cooling type hybrid power thermal management system, comprising an injector, a liquid ammonia hydrogen supply system, a liquid ammonia common rail pipe, a fuel oil common rail pipe and an oil tank, wherein the liquid ammonia hydrogen supply system comprises a liquid ammonia storage tank, an ammonia pumping system, a flow dividing system and an ammonia inlet and outlet system, the fuel oil common rail pipe is respectively connected with the oil tank and a one-way oil inlet of the injector, the liquid ammonia common rail pipe is respectively connected with the ammonia inlet and outlet system and a one-way ammonia inlet of the injector, an ammonia inlet pipe and an ammonia return pipe are arranged in the ammonia inlet and outlet system, the ammonia pumping system comprises a liquid ammonia storage flow divider, a low-pressure pump and a high-pressure pump, the flow dividing system comprises a storage tank, an ammonia inlet control valve, a safety valve and an ammonia outlet control valve, an outlet of the liquid ammonia storage tank is sequentially connected with the low-pressure pump, the high-pressure pump, the liquid ammonia storage flow divider, the storage tank and the ammonia inlet control valve, the ammonia inlet control valve is connected with the liquid ammonia common rail pipe through the ammonia inlet pipe, an inlet of the liquid ammonia storage tank is sequentially connected with the ammonia outlet control valve and the safety valve, the safety valve is connected with the injector through the ammonia return pipe, and the liquid ammonia storage tank is respectively connected with a hydrogen storage tank and a nitrogen storage tank.

2. The liquid ammonia phase-change cooling type hybrid power thermal management system according to claim 1, further comprising a hydrogen fuel cell system, wherein the hydrogen fuel cell system comprises a pile anode, a pile cathode, a hydrogen inlet, a nitrogen inlet and an air inlet, the hydrogen storage tank is connected with the hydrogen inlet, the nitrogen storage tank is connected with the nitrogen inlet, the hydrogen inlet and the nitrogen inlet are converged and then supplied to the pile anode through a hydrogen filter, a first shut-off valve, a high-pressure gas injection valve, a jet pump and hydrogen circulating pump, and waste gas of the pile anode passes through a water separator and is discharged through a drain valve and an exhaust valve respectively; and air passes through an air filter, an air compressor, a first intercooler, a humidifier and a second shut-off valve and then is supplied to the pile cathode.

3. The liquid ammonia phase-change cooling type hybrid power thermal management system according to claim 1, further comprising a double-acting heat pump, wherein the double-acting heat pump comprises a liquid ammonia inlet, a three-way valve, a low-power compressor, a high-power compressor, a refrigerating heat exchanger, a heating heat exchanger and a third radiator, the liquid ammonia storage tank is connected with the liquid ammonia inlet, the liquid ammonia inlet is connected with the three-way valve, high-pressure steam at an outlet of the low-power compressor is introduced into the third radiator, and after being condensed, the high-pressure steam enters the refrigerating heat exchanger through a first electronic expansion valve and a second electronic expansion valve and returns to the low-power compressor; high-pressure steam at an outlet of the high-power compressor enters the heating heat exchanger for condensation and heat release, enters branch circuits where the expansion valves are located through a one-way check valve and the first electronic expansion valve, and a liquid working medium in the branch circuits where the expansion valves are located is evaporated into a gaseous working medium and returns to the high-power compressor.

4. The liquid ammonia phase-change cooling type hybrid power thermal management system according to claim 1, further comprising a liquid ammonia-diesel oil dual-fuel cylinder, wherein the liquid ammonia-diesel oil dual-fuel cylinder comprises a cylinder body, a piston, a crank, an air inlet pipe and an exhaust pipe, the air inlet pipe, the air outlet pipe and the injector are arranged above the cylinder body, the piston is arranged in the cylinder body, the crank is connected below the piston, an air inlet is formed in the joint of the air inlet pipe and the cylinder body, an air inlet valve rod is arranged at the air inlet and sleeved with an air inlet valve rod spring, an air outlet is formed in the joint of the air outlet pipe and the cylinder body, the air outlet is provided with an air outlet valve rod, the air outlet valve rod is sleeved with an air outlet valve rod spring, the air inlet pipe is provided with a hydrogen gas inlet, an air gas inlet is arranged between the hydrogen gas inlet and the air inlet, and a safety valve is arranged between the hydrogen gas inlet and the air gas inlet.

* * * * *